(12) United States Patent
Hartman

(10) Patent No.: US 10,070,658 B1
(45) Date of Patent: Sep. 11, 2018

(54) ADJUSTABLE FISH CLEANING AND FILLETING BOARD

(71) Applicant: George Raymond Hartman, Haines City, FL (US)

(72) Inventor: George Raymond Hartman, Haines City, FL (US)

(\*) Notice: Subject to any disclaimer, the term of this patent is extended or adjusted under 35 U.S.C. 154(b) by 0 days.

(21) Appl. No.: 15/982,639

(22) Filed: May 17, 2018

Related U.S. Application Data

(60) Provisional application No. 62/524,826, filed on Jun. 26, 2017.

(51) Int. Cl.
  *A22C 25/00* (2006.01)
  *A22C 25/06* (2006.01)
  *A22C 25/16* (2006.01)

(52) U.S. Cl.
  CPC ............. *A22C 25/06* (2013.01); *A22C 25/16* (2013.01)

(58) Field of Classification Search
  CPC .......... A22C 25/00; A22C 25/06; A22C 29/00
  USPC ................. 43/56; 99/537, 538; 83/130, 167
  See application file for complete search history.

(56) References Cited

U.S. PATENT DOCUMENTS

| | | | | |
|---|---|---|---|---|
| 3,248,751 A | * | 5/1966 | Wilborn | A22C 25/025 452/105 |
| 5,376,043 A | * | 12/1994 | Carter | A22C 25/06 452/195 |
| 7,390,249 B2 | * | 6/2008 | Sorey | A22C 25/025 452/195 |
| 7,674,163 B2 | * | 3/2010 | Howard | A22C 25/06 452/194 |
| 8,376,816 B2 | * | 2/2013 | Redford | A22C 25/16 452/195 |
| 8,870,637 B1 | * | 10/2014 | Leuallen | A22C 25/06 452/195 |

* cited by examiner

*Primary Examiner* — Richard T Price, Jr.
(74) *Attorney, Agent, or Firm* — Dunlap Bennett & Ludwig PLLC

(57) ABSTRACT

A fish processing apparatus. The fish processing apparatus includes a cutting board, a first clamp and a second clamp. The first clamp is coupled to the cutting board. The second clamp is slidably coupled to the cutting board so that the second clamp may slide towards and away from the first clamp.

10 Claims, 3 Drawing Sheets

ADJUSTABLE FISH CLEANING AND FILLETING BOARD

CROSS-REFERENCE TO RELATED APPLICATION

This application claims the benefit of priority of U.S. provisional application No. 62/524,826, filed Jun. 26, 2017, the contents of which are herein incorporated by reference.

BACKGROUND OF THE INVENTION

The present invention relates to fish cleaning and filleting and, more particularly, to an adjustable fish cleaning and filleting board.

Fillets are usually obtained by slicing the fish parallel to the spine, rather than perpendicular to the spine as is the case with steaks. The remaining bones with the attached flesh is called the "frame" and is often used to make fish stock. As opposed to whole fish or fish steaks, fillets do not contain the fish's backbone; they yield less flesh but are easier to eat.

Cleaning, scaling, and filleting fish can be very difficult. The fish may be easily dropped, or a user may cut themselves since live fish move around and are slippery.

As can be seen, there is a need for an improved cutting board that secures different sized fish.

SUMMARY OF THE INVENTION

In one aspect of the present invention, a fish processing apparatus comprises: a board comprising an upper surface, a lower surface and an elongated slot; a first clamp coupled to the upper surface of the board; a second clamp; and a connector disposed within the elongated slot and slidably coupling the second clamp to the upper surface of the board, wherein the second clamp is configured to slide towards and away from the first clamp along the elongated slot.

In another aspect of the present invention, a fish processing apparatus comprises: a cutting board comprising an upper surface, a lower surface and an elongated slot; a first clamp fixedly coupled to the upper surface of the board; a second clamp comprising at least one rivet opening; and at least one rivet running through the rivet opening and into the elongated slot, thereby slidably connecting the second clamp to the cutting board, wherein the second clamp is configured to slide towards and away from the first clamp along the elongated slot.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

The present invention includes an adjustable fish cleaning and filleting board. The present invention aids fisherman with cleaning and scaling or filleting a fish and reduces the chances of getting finned, cutting yourself, or dropping the fish. The present invention is an adjustable device including a cutting board with two clamps that securely hold a fish while the user cleans and fillets them. When in use, at least one of the first clamp and second clamp are adjusted along a slot of the cutting board based on the length of the fish. The tail is secured to one of the clamps and the head is secured to the other of the clamps. The fish may then be gutted, cleaned and filleted.

Figure 1:
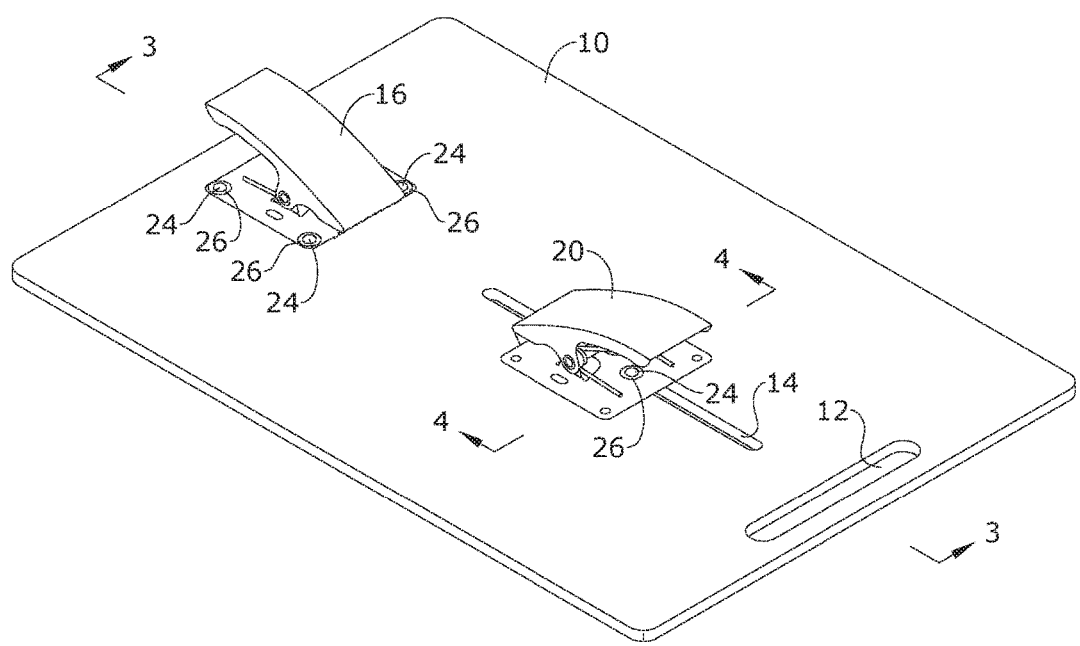
FIG. 1 is a perspective view of an embodiment of the present invention.
Figure 2:
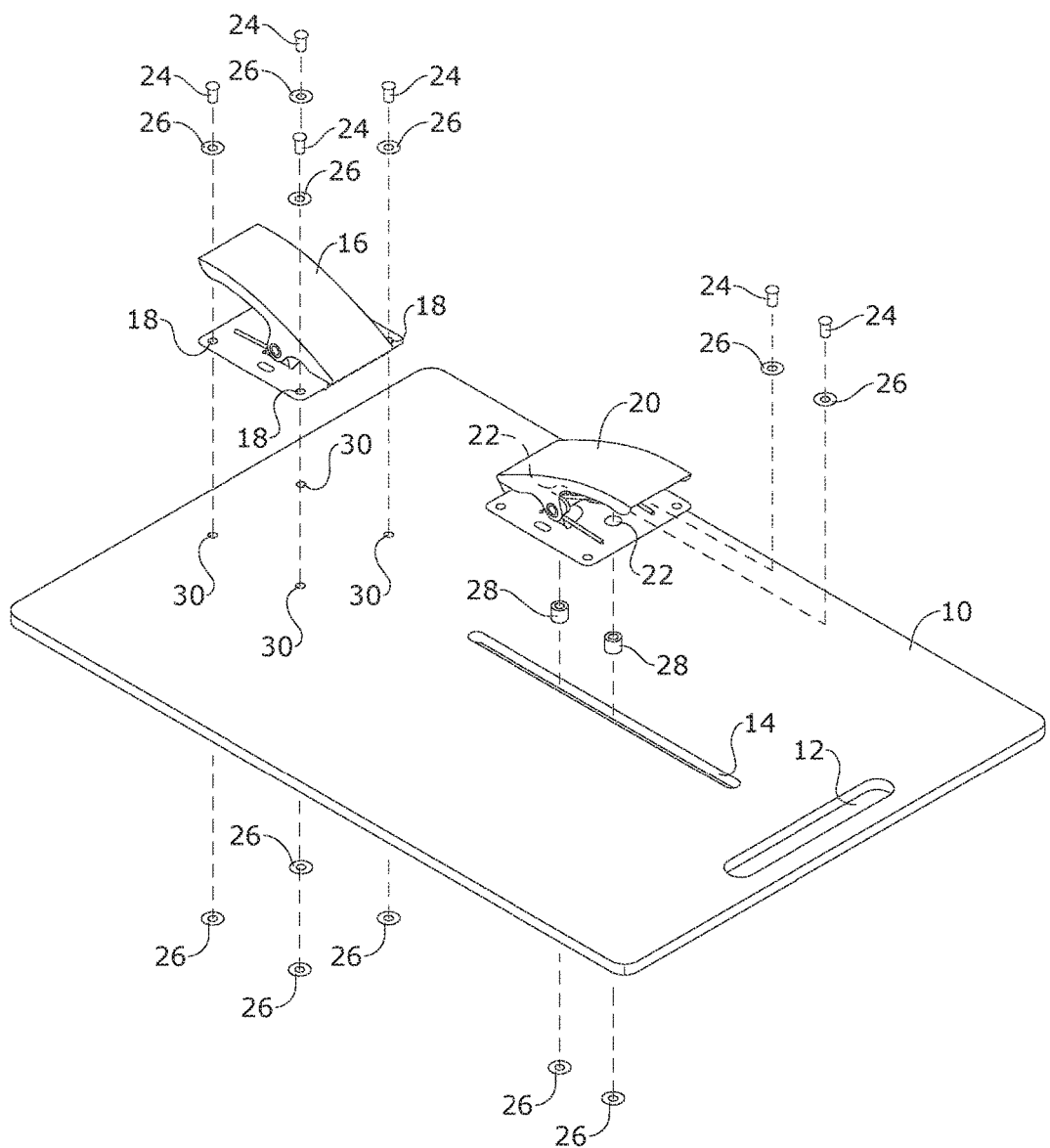
FIG. 2 is an exploded view of an embodiment of the present invention.
Figure 3:
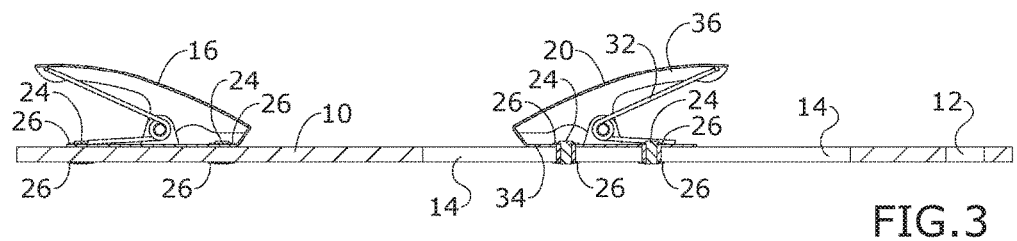
FIG. 3 is a section view taken along line 3-3 in FIG. 1.
Figure 4:
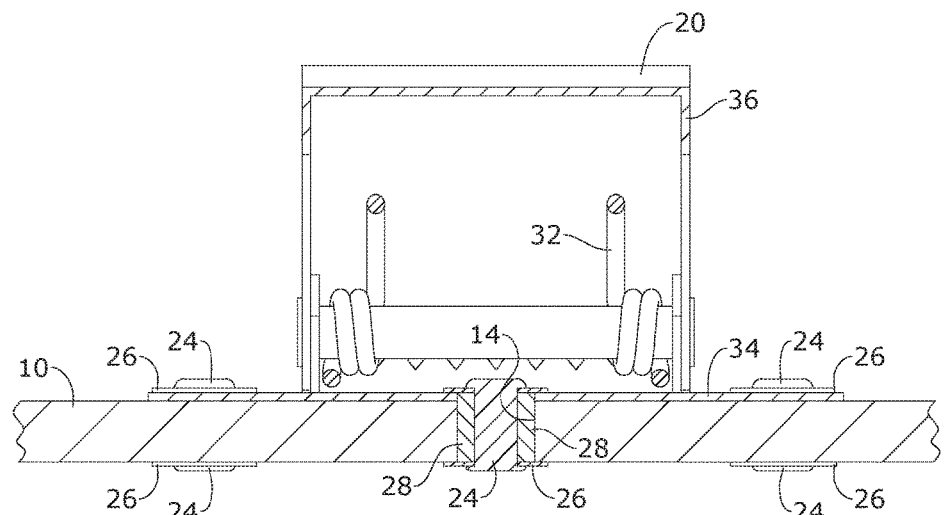
FIG. 4 is a section view taken along line 4-4 in FIG. 1.
Figure 5:
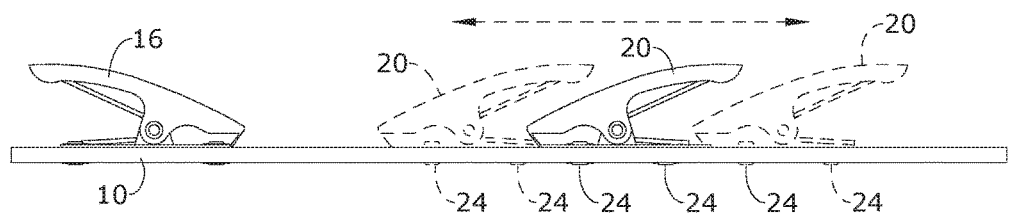
FIG. 5 is a side view of an embodiment of the present invention illustrating the sliding adjustment of a clamp.

Referring to FIGS. 1 through 5, the present invention includes a fish processing apparatus. The fish processing apparatus includes a cutting board 10, a first clamp 16 and a second clamp 20. The first clamp 16 is coupled to the cutting board 10. The second clamp 20 is slidably coupled to the cutting board 10 so that the second clamp 20 may slide towards and away from the first clamp 16.

The cutting board 10 of the present invention is a durable board made of a wood or plastic. The cutting board 10 may vary in width and length. The cutting board 10 includes an upper surface and a lower surface. The upper surface may be substantially planar and may be the cutting surface. An elongated handle slot 12 may be formed along a periphery of the cutting board 10. The cutting board 10 may further include an elongated slot 14.

The first clamp 16 and the second clamp 20 may be coupled to the upper surface of the cutting board 10. A connector 24, 28 is disposed within the elongated slot 14 and slidably couples the second clamp 20 to the upper surface of the cutting board 10.

The first clamp 16 and the second clamp 20 are used to clamp a fish to the upper surface of the cutting board 10. The first clamp 16 and the second clamp 20 may each include a base 34 and a jaw 36 pivotally secured to the base and resiliently biased towards the base 34 by a spring 32. The jaw 36 of the first clamp 16 faces the jaw 36 of the second clamp 20. While in use, a rear end of the jaw 36 may be pressed to pivot a front end of the jaw 36 away from the base 34 against the bias of the spring 32. While the jaw 36 is open, the user may place the fish in between the jaw 36 and the base 34. The user may then release the jaw 36 and the jaw 36 may bias back towards the base 34 against the fish, thereby clamping the fish to the upper surface of the cutting board 10.

In certain embodiments, both of the clamps 16, 20 may be slidably engaged with the cutting board 10. In other embodiments, the first clamp 16 is fixedly coupled to the cutting board 10 and the second clamp 20 is slidably coupled to the cutting board 10. In such embodiments, the base 34 of the first clamp 16 includes a plurality of rivet openings 18. A plurality of rivets 24 run through the plurality of rivet openings 18 and washers 26 and into openings 30 formed in the upper surface of the cutting board 10, thereby fixing the first clamp 16 to the cutting board 10.

The connector 24, 28 slidably connects the second clamp 20 to the cutting board 10. The connector 24, 28 may include bushings 28 disposed around rivets 24. In such embodiments, the second clamp 20 includes a pair of rivet openings 22. A pair of rivets 24 run through the pair of rivet openings 30, through washers 26, and through the elongated slot 14.

The bushings 28 are disposed around the pair of rivets 24. The bushings 28 may include cylinders that rotate about the rivets 24, are thereby slidably engage with the elongated slot 14.

It should be understood, of course, that the foregoing relates to exemplary embodiments of the invention and that modifications may be made without departing from the spirit and scope of the invention as set forth in the following claims.

What is claimed is:

1. A fish processing apparatus comprising:
    a board comprising an upper surface, a lower surface and an elongated slot;
    a first clamp coupled to the upper surface of the board;
    a second clamp; and
    a connector disposed within the elongated slot and slidably coupling the second clamp to the upper surface of the board, wherein
    the second clamp is configured to slide towards and away from the first clamp along the elongated slot.

2. The fish processing apparatus of claim 1, wherein the first clamp is fixedly coupled to the upper surface of the board.

3. The fish processing apparatus of claim 2, wherein the first clamp comprises a plurality of rivet openings, wherein a plurality of rivets run through the plurality of rivet openings and into the upper surface of the board.

4. The fish processing apparatus of claim 1, wherein the second clamp comprises a plurality of rivet openings, wherein the connector comprises a pair of rivets running through the pair of rivet openings and through the elongated slot, and bushings disposed around the pair of rivets and slidably engaged with the elongated slot.

5. The fish processing apparatus of claim 1, wherein the first clamp and the second clamp each comprise:
    a base; and
    a jaw resiliently biased towards the base by a spring, wherein
    the jaw of the first clamp faces the jaw of the second clamp.

6. The fish processing apparatus of claim 1, wherein the board further comprises an elongated handle slot formed along a periphery of the board.

7. A fish processing apparatus comprising:
    a cutting board comprising an upper surface, a lower surface and an elongated slot;
    a first clamp fixedly coupled to the upper surface of the board;
    a second clamp comprising at least one rivet opening; and
    at least one rivet running through the rivet opening and into the elongated slot, thereby slidably connecting the second clamp to the cutting board, wherein
    the second clamp is configured to slide towards and away from the first clamp along the elongated slot.

8. The fish processing apparatus of claim 7, wherein the first clamp comprises a plurality of rivet openings, wherein a plurality of rivets run through the plurality of rivet openings and into the upper surface of the board.

9. The fish processing apparatus of claim 7, wherein the first clamp and the second clamp each comprise:
    a base; and
    a jaw resiliently biased towards the base by a spring, wherein
    the jaw of the first clamp faces the jaw of the second clamp.

10. The fish processing apparatus of claim 7, wherein the cutting board further comprises an elongated handle slot formed along a periphery of the board.

* * * * *